United States Patent
Miyashita

(10) Patent No.: US 7,420,726 B2
(45) Date of Patent: Sep. 2, 2008

(54) MOUNTING STRUCTURE, ELECTRO-OPTICAL DEVICE AND ELECTRONIC APPARATUS, AND MAGNETIC CHUCKING DEVICE

(75) Inventor: Tomoaki Miyashita, Shimosowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 262 days.

(21) Appl. No.: 11/223,016

(22) Filed: Sep. 12, 2005

(65) Prior Publication Data
US 2006/0098305 A1     May 11, 2006

(30) Foreign Application Priority Data
Nov. 9, 2004     (JP)   ............................. 2004-324752

(51) Int. Cl.
    *G02F 1/03*     (2006.01)
(52) U.S. Cl. ...................... 359/254; 359/267; 359/322
(58) Field of Classification Search .................. 359/254
See application file for complete search history.

(56) References Cited

U.S. PATENT DOCUMENTS 5,410,425 A * 4/1995 Rhodes ....................... 359/254
5,459,594 A * 10/1995 Nakanishi et al. ............ 349/187
6,088,025 A * 7/2000 Akamine et al. ............. 345/175
6,429,961 B1 * 8/2002 Harary et al. ................ 359/296
7,023,504 B2    4/2006 Miyashita et al.

FOREIGN PATENT DOCUMENTS

| JP | A 63-212428 | 9/1988 |
| JP | A-5-134248 | 5/1993 |
| JP | U-5-45654 | 6/1993 |
| JP | A 2000-147343 | 5/2000 |
| JP | A 2000-258859 | 9/2000 |
| JP | A 2004-198934 | 7/2004 |

\* cited by examiner

*Primary Examiner*—Jessica T Stultz
(74) *Attorney, Agent, or Firm*—Oliff & Berridge, PLC

(57) ABSTRACT

A mounting structure for accommodating an electro-optical device having an image display area from which display light exits and for holding the accommodated electro-optical device by magnetic force includes a case and a mounting unit. The case has a window disposed in correspondence with the image display area, surrounds the electro-optical device from a peripheral edge of the electro-optical device, and has at least a portion of a surface at a side opposite to a side facing the electro-optical device formed of a magnetic material. The mounting unit is disposed at the case and is used for mounting the mounting structure to a mounting member which is an object for mounting the mounting structure thereto.

2 Claims, 10 Drawing Sheets

MOUNTING STRUCTURE, ELECTRO-OPTICAL DEVICE AND ELECTRONIC APPARATUS, AND MAGNETIC CHUCKING DEVICE

BACKGROUND

This nonprovisional application claims the benefit of Japanese Patent Application No. 2004-324752, filed Nov. 9, 2004. The entire disclosure of the prior applications is hereby incorporated by reference herein in its entirety.

1. Technical Field

The present invention relates to a mounting structure for mounting or accommodating an electro-optical device such as a liquid crystal device used as, for example, a light valve of a liquid crystal projector, the electro-optical device mounted to or accommodated in the mounting structure, an electronic apparatus such as a liquid crystal projector including the electro-optical device, and a magnetic chucking device for transporting the mounting structure.

2. Related Art

When transporting a mounting structure of this type while an electro-optical device is accommodated in the mounting structure of this type, the mounting structure is, for example, secured to a transporter with a mechanical chuck or a vacuum chuck. More specifically, for example, mechanical chucking is performed by picking up the mounting structure with an arm of a robot serving as the transporter and securing it to the transporter.

JP-A-5-134248 and JP-UM-A-5-45654 disclose a technology in which, in a liquid crystal device (which is an example of an electro-optical device), spacers which maintain a gap at a predetermined value between a pair of substrates sandwiching liquid crystals (which are electro-optical materials) are formed of a magnetic material, and the spacers are brought together and disposed at predetermined locations by magnetic force.

However, in the aforementioned mechanical chuck and vacuum chuck, the mechanism for securing the mounting structure is complicated. In addition, the structure of the transporter is complicated. Further, the electro-optical device may become damaged when a relatively strong stress which is exerted upon the mounting structure is transmitted to the electro-optical device.

SUMMARY

An advantage of the invention is that it provides a mounting structure which makes it possible to reduce stress exerted upon an electro-optical device during chucking and which can be chucked with a simple mechanism, the electro-optical device which is mounted to or accommodated in the mounting structure, an electronic apparatus, such as a liquid crystal projector, including the electro-optical device, and a magnetic chucking device for transporting the mounting structure.

To this end, according to a first aspect of the invention, there is provided a mounting structure for accommodating an electro-optical device having an image display area from which display light exits and for holding the accommodated electro-optical device by magnetic force. The mounting structure includes a case and at least one mounting unit. The case has a window disposed in correspondence with the image display area, surrounds the electro-optical device from a peripheral edge of the electro-optical device, and has at least a portion of at least one surface at a side opposite to a side facing the electro-optical device formed of a magnetic material. The at least one mounting unit is disposed at the case and is used for mounting the mounting structure to a mounting member which is an object for mounting the mounting structure thereto.

In the mounting structure according to the first aspect of the invention, for example, an electro-optical device which emits display light by transmission or reflection in accordance with light incident upon an image display area from a light source is mounted. Alternatively, an electro-optical device which emits display light by, for example, generating light by itself from an image display area is mounted. An example of such an electro-optical device is a liquid crystal device mounted as a light valve in a projection display apparatus such as a liquid crystal projector. Another example is a self light generation type organic electro-luminescence (EL) device.

The mounting structure includes a case and a mounting unit disposed at the case. For example, the electro-optical device surrounded by the case from its peripheral edge is accommodated in the case. It is desirable that, while the electro-optical device is accommodated in the mounting structure in this way, a peripheral area of the electro-optical device situated near the image display area be at least partly covered with the case. This makes it possible for the case to have a light-shielding property to at least partly prevent escape of light at the peripheral area or to at least partly prevent entrance of stray light into the image display area from the peripheral area.

The case may include a plurality of members. For example, the case is formed so as to include a cover having the shape of a box without a covering portion and a plate functioning as the covering portion of the cover. It is possible to accommodate the electro-optical device in the case by, while the electro-optical device is placed on the plate, mounting the plate to the cover and covering the electro-optical device with the cover. In this case, in the case, a window is defined by the cover or the plate. For example, projection light is incident upon the electro-optical device from the window or display light of the electro-optical device exits from this window.

The mounting unit is disposed at the periphery of the case, and at a member, such as the cover or the plate, of the case. For example, the mounting unit is provided as a mount hole-formation portion corresponding to a cover wall or a plate wall defining a mount hole in the cover or the plate. It is desirable that at least three mounting units be disposed at the respective vertices of a triangle at the peripheral portion of the case. This makes it possible to, while the electro-optical device is accommodated in the case, to precisely secure the mounting structure positioned with respect to, for example, an optical component (mounting member), such as a dichroic prism, in a liquid crystal projector to the optical component with the mounting units. "Mounting member" in the invention refers to an object for mounting the mounting structure thereto by a mounting unit, Examples of the mounting member include an optical component, a casing, a frame, a box member, a body, etc., related to various electronic apparatuses. Here, the mounting unit may also function as a positioning mechanism by positioning the mounting structure with respect to the mounting member by the mounting unit.

Further, the case is such that at least a portion of a surface at a side opposite to a side facing the electro-optical device accommodated in the case is formed of a magnetic material. For example, when the surface of the case at the side opposite to the side facing the electro-optical device is entirely formed of a magnetic material, the case itself may only be formed of the magnetic material. Alternatively, when the case includes a plurality of members, at least one of the plurality of members may be such that a surface at a side opposite to a side facing the electro-optical device is formed of a magnetic material. Here, the at least one member itself may be formed only of the magnetic material.

Accordingly, while the electro-optical device is accommodated in the case, the surface of the case that is formed of a magnetic material can be secured by a magnetic force, that is, the mounting structure can be held by a magnet chuck. Therefore, compared to a mechanical chuck and a vacuum chuck, the mechanism for holding the mounting structure can be simplified. In addition, since, when a magnet chuck is used, the surface of the case that is formed of the magnetic material is secured, stress generated at the mounting structure can be reduced compared to when a mechanical chuck or a vacuum chuck is used. Therefore, it is possible to prevent damage to the electro-optical device resulting from the transmission of stress generated at the mounting structure to the electro-optical device accommodated in the mounting structure when holding the mounting structure. Such a magnet chuck may be one which generates a magnetic force by a permanent magnet or one which generates a magnetic force by an electromagnet.

Here, it is desirable that the case be formed of, in addition to the magnetic material, a material having excellent thermal conductivity and light-shielding property. This structure makes it possible for the case to have a light-shielding function and to function as a heat sink. Therefore, even if the temperature of the electro-optical device is increased due to, for example, projection light impinging upon the electro-optical device or light being generated by the electro-optical device itself when it is being operated, the electro-optical device can be effectively cooled by conducting heat between the electro-optical device and the case.

It is preferable that the case include a cover which covers the electro-optical device and has the at least a portion at the surface formed of the magnetic material.

According to this form, the surface formed of a magnetic material of the cover (which is a member of the case) is secured with a magnet chuck, so that the mounting structure in which the electro-optical device is accommodated can be held.

Here, when the case has a plate in addition to the cover, the mounting structure in which the electro-optical device is accommodated is secured with a mounting unit to, for example, an optical component in a liquid crystal projector by making the cover or the plate face the optical part. Here, when the cover is made to face the optical component, at least a portion of the surface of the mounting structure facing the optical component is secured and held with a magnet chuck, and the mounting structure is moved with respect to the optical component, so that the electro-optical device accommodated in the mounting structure and the optical component can be positioned with respect to each other.

Alternatively, when the plate is to face the optical component, at least a portion of a surface at a side of the mounting structure opposite to a side facing the optical part is secured and held with a magnet chuck, and the mounting structure is moved with respect to the optical component, so that the electro-optical device accommodated in the mounting structure and the optical component can be positioned with respect to each other.

It is preferable that the case include a plate on which the electro-optical device is placed, the case having the at least a portion at the surface formed of the magnetic material.

According to this form, the plate being a member of the case is such that its surface formed of a magnetic material is secured with a magnet chuck to make it possible to hold the mounting structure in which the electro-optical device is accommodated.

Here, when the case includes the cover in addition to the plate, and the mounting structure is secured with the cover facing, for example, the optical component in a liquid crystal projector while the electro-optical device is accommodated in the mounting structure, the surface at the side of the mounting structure opposite to the side facing the optical part can at least partly be secured and held by a magnet chuck. Then, moving the mounting structure held in this way with respect to the optical component makes it possible to position the optical component and the electro-optical device accommodated in the mounting structure with respect to each other.

Alternatively, when the plate is to face the optical component, the surface at the side of the mounting structure facing the optical component is at least partly secured and held by a magnet chuck, and the mounting structure is moved with respect to the optical component, so that the optical component and the electro-optical device accommodated in the mounting structure can be positioned with respect to each other.

It is preferable that the case include a cover for covering the electro-optical device and a plate which is mounted to the cover while the electro-optical device is placed on the plate, and that the cover and the plate each have the at least a portion at the surface formed of the magnetic material.

According to this form, the surface formed of a magnetic material of the plate or the cover of the case is secured with a magnet chuck, so that the mounting structure in which the electro-optical device is accommodated can be held.

Therefore, when the plate or the cover in the mounting structure is made to face and is secured to, for example, an optical component in a liquid crystal projector, at least a portion of the surface at the side of the mounting structure facing the optical component or at least a portion of the surface at the side of the mounting structure opposite to the side facing the optical component is secured and held with a magnet chuck. By moving the mounting structure with respect to the optical component, the optical component and the electro-optical device accommodated in the mounting structure can be positioned with respect to each other.

It is preferable that the at least one mounting unit include three mounting units disposed at different locations of the case.

According to this form, the positioned mounting structure can be more precisely secured to, for example, an optical component in a liquid crystal projector with the mounting units while it is positioned with respect to the optical component. Even if the surface at the side of the case of the mounting structure opposite to the side facing the electro-optical device is entirely formed of a magnetic material, an increase in the number of mounting units in the mounting structure causes a larger portion of the surface to be occupied by the mounting units, thereby making it possible to actually reduce the size of the portion of the surface which can be effectively magnetically chucked. This makes it difficult to hold the mounting structure with the magnet chuck. Therefore, the mounting structure cannot be precisely positioned with respect to the optical component.

Consequently, by minimizing the number of mounting units to that allowing the mounting structure to be secured to the optical component, that is, by using three mounting units as mentioned above, the mounting structure can be more reliably held with the magnet chuck, so that the mounting structure can be more precisely positioned with respect to the optical component.

To the aforementioned end, according to a second aspect of the invention, there is provided an electro-optical device which is accommodated in any one of the above-described mounting structures and which has the image display area from which the display light exits.

The electro-optical device according to the second aspect of the invention can also be held by securing and holding the mounting structure with a magnet chuck while the electro-optical device is accommodated in any one of the above-described mounting structure.

Therefore, compared to the case in which the mounting structure is secured and held with a mechanical chuck or a vacuum chuck, the electro-optical device can be held with a simple structure, and, by reducing stress that is produced at the mounting structure when it is held, it is possible to prevent damage to the electro-optical device resulting from the transmission of stress that is produced at the mounting structure to the electro-optical device.

To the aforementioned end, according to a third aspect of the invention, there is provided an electronic apparatus including any one of the above-described mounting structures and the electro-optical device accommodated in the mounting structure and having the image display area from which the display light exits.

When assembling the electronic apparatus according to the third aspect of the invention, the electro-optical device accommodated in the mounting structure can be positioned by securing and holding the mounting structure with a magnet chuck and moving the mounting structure.

It is preferable that the electronic apparatus further include a light supplier, synthesizer, and a light projector. The light supplier separately supplies light beams of a plurality of colors to a plurality of the electro-optical devices, at least one of the electro-optical devices being accommodated in the mounting structure. The synthesizer serves as the mounting member for mounting the mounting structure thereto with the at least one mounting unit, and synthesizes the light beams of the plurality of colors that are incident thereupon through the plurality of the electro-optical devices. The light projector projects the light beams exiting from the synthesizer.

According to this form, the electronic apparatus can be formed as a projection display apparatus such as a liquid crystal projector.

In this form, for example, three types of colored light beams, that is, a red (R) light beam, a green (G) light beam, and a blue (B) light beam are separately supplied from the light supplier, and three electro-optical devices, that is, an R electro-optical device, a G electro-optical device, and a B electro-optical device, are provided in correspondence with these three colored light beams. Of the three colored lights supplied separately from the light supplier, the R light beam is incident upon the R electro-optical device, the G light beam is incident upon the G electro-optical device, and the B light beam is incident upon the B electro-optical device. The three colored light beams exiting separately through the R electro-optical device, the G electro-optical device, and the B electro-optical device impinge upon and are synthesized by the synthesizer formed as, for example, a dichroic prism. Then, the synthesized light is projected onto, for example, a screen by, for example, a projection lens serving as the light projector.

In this case, the three electro-optical devices are secured to the dichroic prism while they are positioned with respect to the dichroic prism. In addition, at least one of the three electro-optical devices is accommodated in any one of the above-described mounting structures, and the at least one electro-optical device accommodated in the mounting structure is secured and mounted to the dichroic prism with the at least one mounting unit.

Accordingly, in this form, of the three electro-optical devices, the at least one electro-optical device accommodated in the mounting structure can be positioned with respect to the dichroic prism and can be aligned with respect to the other electro-optical device or devices by securing and holding the mounting structure with a magnet chuck and moving the mounting structure with respect to the dichroic prism.

It is preferable that, in the electronic apparatus including a synthesizer, the at least one of the electro-optical devices be disposed so as to be separated from the synthesizer by a predetermined distance.

According to such a structure, by installing a cooler for supplying cooling air into, for example, a liquid crystal projector, and by circulating the cooling air between the at least one electro-optical device and the synthesizer to cause the cooling air to contact the at least one electro-optical device or the synthesizer, the at least one electro-optical device or the synthesizer can be efficiently cooled even if its temperature is increased when operating the electronic apparatus. When a magnet chuck which can be placed in this predetermined interval is used, the assembly becomes easier.

To the aforementioned end, according to a fourth aspect of the invention, there is provided a first magnetic chucking device for holding the mounting structure accommodating the electro-optical device in the electronic apparatus. The magnetic chucking device includes a securing unit for securing by magnetic force the at least a portion of the at least one surface at the side of the mounting structure opposite to the side facing the electro-optical device, and a moving unit for moving the securing unit in order to position in the electronic apparatus the electro-optical device accommodated in the mounting structure secured to the securing unit.

According to the first magnetic chucking device of the fourth aspect of the invention, the securing unit secures and holds by a magnet chuck the surface formed of a magnetic material of the case of the mounting structure while the electro-optical device is accommodated in the mounting structure. In, for example, a liquid crystal projector, by moving the securing unit with the moving unit, the mounting structure secured to the securing unit is moved with respect to an optical component, so that the optical component and the electro-optical device accommodated in the mounting structure can be positioned.

Therefore, according to the first magnetic chucking device of the fourth aspect of the invention, compared to the case in which the mounting structure is secured with a mechanical chuck or a vacuum chuck in the securing unit, the mechanism for holding the mounting structure in the securing unit is simplified, and stress produced in the mounting structure when performing a positioning operation can be reduced. Consequently, the structure of the first magnetic chucking device is simplified, and damage to the electro-optical device resulting from the transmission of stress produced in the mounting structure when performing the positioning operation can be prevented.

To the aforementioned end, according to a fifth aspect of the invention, there is provided a second magnetic chucking device for holding the mounting structure accommodating the at least one of the electro-optical devices in the electronic apparatus. The magnetic chucking device includes a securing unit for securing by magnetic force the at least a portion of the at least one surface at the side of the mounting structure opposite to the side facing the at least one of the electro-optical devices, and a moving unit for moving the securing unit with respect to the synthesizer in order to position the at least one of the electro-optical devices accommodated in the mounting structure secured to the securing unit with respect to the synthesizer.

According to the second magnetic chucking device of the fifth aspect of the invention, the securing unit secures and holds by a magnet chuck the surface formed of a magnetic material of the case of the mounting structure while the at least one electro-optical device is accommodated in the mounting structure. In, for example, a projection display apparatus such as a liquid crystal projector, the mounting structure secured to the securing unit is moved by moving the securing unit with respect to, for example, the synthesizer, such as a dichroic prism, with the moving unit so that the at least one electro-optical device accommodated in the mounting structure can be positioned with respect to the synthesizer. In addition, as mentioned above, as regards the plurality of electro-optical devices secured to the synthesizer, the at least one electro-optical device accommodated in the mounting structure and the remaining electro-optical device or devices can be positioned with respect to each other.

Therefore, according to the second magnetic chucking device of the fifth aspect of the invention, the mechanism for holding the mounting structure in the securing unit is simplified, and stress produced at the mounting structure when positioning the electro-optical devices in, for example, a liquid crystal projector can be reduced. Consequently, the structure of the second magnetic chucking device is simplified, and damage to the at least one electro-optical device resulting from the transmission of stress produced in the mounting structure when positioning the electro-optical devices in, for example, a liquid crystal projector can be prevented.

In the second magnetic chucking device, it is preferable that the securing unit secure the at least a portion of the mount structure at the surface facing the synthesizer.

According to this form, when the surface formed of a magnetic material of the case of the mounting structure is made to face the synthesizer, the securing unit is disposed between the synthesizer and the mounting structure accommodating the at least one electro-optical device when positioning the electro-optical devices in, for example, a liquid crystal projector. Accordingly, by disposing the securing unit, magnetic chucking can be effectively performed at a larger portion of the surface at the side of the case of the mounting structure opposite to the side facing the electro-optical device. As a result, since the mounting structure can be more reliably held with a magnet chuck in the securing unit, the mounting structure can be more precisely positioned with respect to the synthesizer.

In the second magnetic chucking device, it is preferable that the securing unit secure the at least a portion of the mount structure at the surface at a side opposite to a side facing the synthesizer.

According to this form, the surface at the side of the case of the mounting structure opposite to the side facing the synthesizer formed of a magnetic material is secured and held with the securing unit. Therefore, as mentioned above, compared to the case in which the surface at the side of the mounting structure facing the electro-optical device is held with the securing unit, it is possible to dispose the securing unit in a wider space. Consequently, the surface at the side of the mount case 601 opposite to the side facing the electro-optical device may be effectively magnetically chucked at various locations or a larger portion of the surface may be effectively magnetically chucked. In addition, the securing unit can be moved with the moving unit in a wider space.

Therefore, when positioning the electro-optical devices in, for example, a liquid crystal projector, the mounting structure can be more easily and reliably held at the securing unit. As a result, it is possible to simplify the mechanism for holding the mounting structure in the securing unit and to more precisely position the mounting structure with respect to the synthesizer.

In the first or second magnetic chucking device, it is preferable that the securing unit intermittently generate the magnetic force.

According to this form, for example, after generating a magnetic force at the securing unit when holding the mounting structure, positioning the electro-optical devices in a liquid crystal projector, and securing the mounting structure to, for example, the synthesizer such as a dichroic prism which is an optical component, the generation of the magnetic force at the securing unit is stopped, so that the holding of the mounting structure is completed. Therefore, the mounting structure can be easily held at the securing unit. Such a securing unit may include, for example, an electromagnet. When the supply of electrical current to the securing unit is stopped, the generation of magnetic force can be stopped.

According to a seventh aspect of the invention, there is provided a third magnetic chucking device including a securing unit for securing any one of the mounting structure by magnetic force while the electro-optical device is accommodated in the mounting structure, and a moving unit for moving the securing unit while the securing unit secures the mounting structure.

According to the third magnetic chucking device of the seventh aspect of the invention, with the electro-optical devices being accommodated in the mounting structure, the surface formed of a magnetic material of the case of the mounting structure is secured and held with the securing unit. Then, moving the securing unit with the moving unit makes it possible to transport the mounting structure secured to the securing unit.

Accordingly, according to the third magnetic chucking device of the seventh aspect of the invention, compared to the case in which the mounting structure is secured with a mechanical chuck or a vacuum chuck in the securing unit, the mechanism for holding the mounting structure in the securing unit is simplified, and stress produced at the mounting structure when transporting the mounting structure can be reduced. Therefore, the structure of the third magnetic chucking device is simplified, and damage to the electro-optical device resulting from stress produced at the mounting structure when the mounting structure is transported can be prevented.

Such an operation and other advantages of the invention are apparent from the following embodiments described below.

DESCRIPTION OF EXEMPLARY EMBODIMENTS

Embodiments according to the invention will hereunder be described with reference to the drawings.

1. Embodiment of Electronic Apparatus

Figure 1:
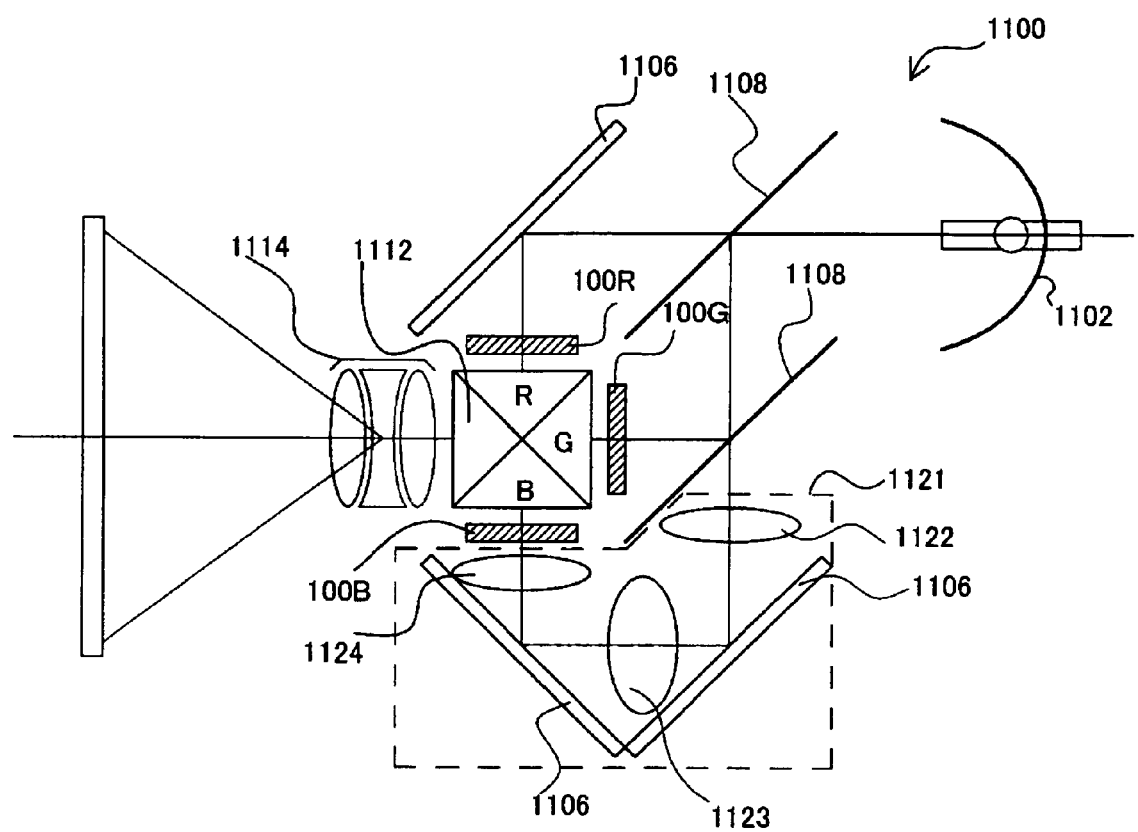
FIG. 1 is a schematic sectional view of a projection liquid crystal display apparatus.

An electronic apparatus according to an embodiment of the invention will be described with reference to FIG. 1 while focusing on an optical system incorporated in an optical unit of the electronic apparatus. FIG. 1 is a schematic sectional view of a projection liquid crystal display apparatus which is an example of the electronic apparatus. The projection display apparatus according to the embodiment is constructed as a multiple-plate color projector including three liquid crystal light valves which are examples of electrical-optical devices accommodated in a mounting structure in the embodiment of the invention.

In FIG. 1, a liquid crystal projector 1100, which is an example of the multiple-plate color projector in the embodiment, is constructed as a projector including three liquid crystal light valves serving as electro-optical devices having drive circuits mounted on a TFT array substrate, that is, light valves 100R, 100G, and 100B.

In the liquid crystal projector 1100, a "light supplier" in the embodiment of the invention includes a lamp unit 1102, three mirrors 1106, and two dichroic mirrors 1108. When projection light is generated from the lamp unit 1102 (which is a white light source such as a metal halide lamp), the three mirrors 1106 and the two dichroic mirrors 1108 divide the projection light into light beams of three primary colors, a red (R) light beam, a green (G) light beam, and a blue (B) light beam. The R light beam impinges upon the light valve 100R for the R light beam, the G light beam impinges upon the light valve 100G for the G light beam, and the B light beam impinges upon the light valve 100B for the B light beam. The "light supplier" in the embodiment of the invention also includes a relay lens system 1121 including an incident lens 1122, a relay lens 1123, and an exiting lens 1124. In particular, the B light beam is guided to the light valve 100B through the relay lens system 1121 in order to prevent light loss due to a long light path. Light components corresponding to the three primary colors modulated by the light valves 100R, 100G, and 100B, respectively, are re-synthesized by a dichroic prism 1112, and, then, the re-synthesized light component is projected as a color image onto, for example, a screen through a projection lens 1114.

For example, active matrix driving liquid crystal devices using TFTs as switching elements as described later are used as the light valves 100R, 100G, and 100B. The light valves 100R, 100G, and 100B are constructed by accommodating the electro-optical devices in a mounting structure as described in detail below. In the liquid crystal projector 1100 according to the embodiment, the light valves 100R, 100G, and 100B are positioned with respect to and secured to the dichroic prism 1112. Any one of the light valves 100R, 100G, and 100B may be constructed by accommodating the electro-optical device in the mounting structure.

Coolers, such as sirocco fans (not shown in FIG. 1), for supplying cooling air may be provided with respect to the three types of light valves 100R, 100G, and 100B in the liquid crystal projector 1100.

2. Embodiment of Electro-optical Device

The entire structure of an electro-optical device according to an embodiment of the invention will be described with reference to FIGS. 2 and 3. Here, a TFT active matrix driving liquid crystal device of a drive circuit built-in type will be taken as an example of each electro-optical device. The electro-optical devices according to the embodiment are used as the liquid crystal light valves 100R, 100G, and 100B in the above-described liquid crystal projector 1100.

Figure 2:
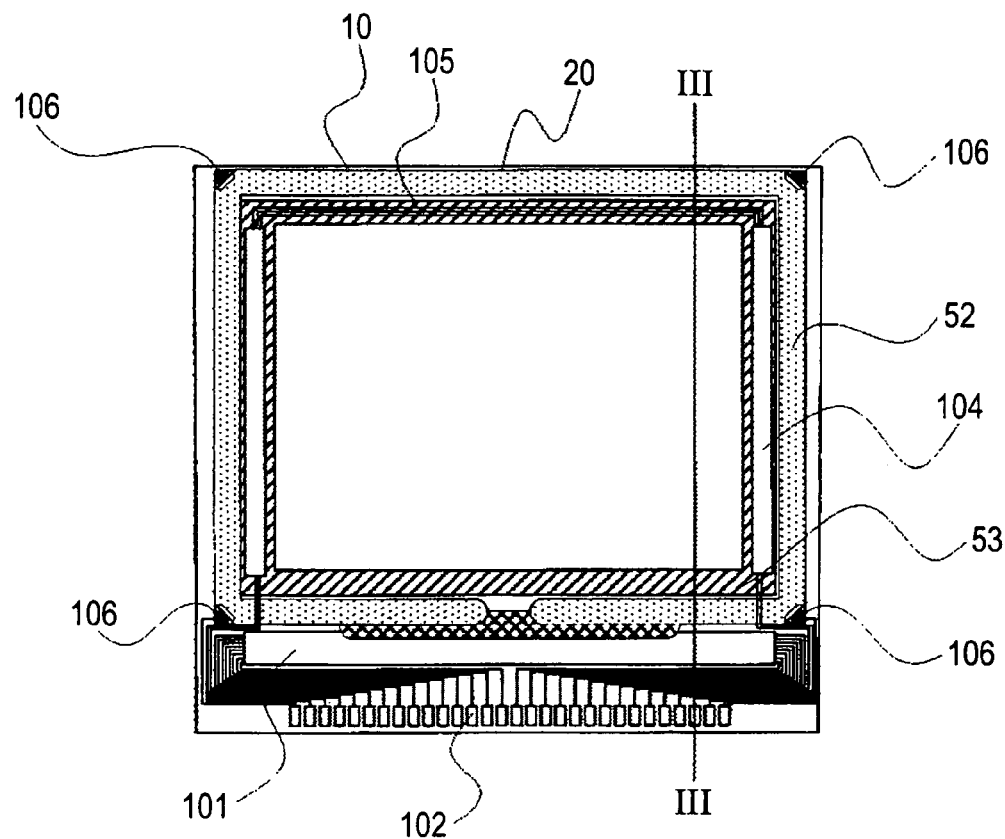
FIG. 2 is a plan view of the entire structure of an electro-optical device.

FIG. 2 is a plan view of a TFT array substrate and each structural element formed thereon as seen from an opposing substrate. FIG. 3 is a sectional view taken along line III-III in FIG. 2. In each of the figures referred to below, layers and members are drawn in different scales to allow the layers and member to be large enough to be recognizable in the figures.

Figure 3:
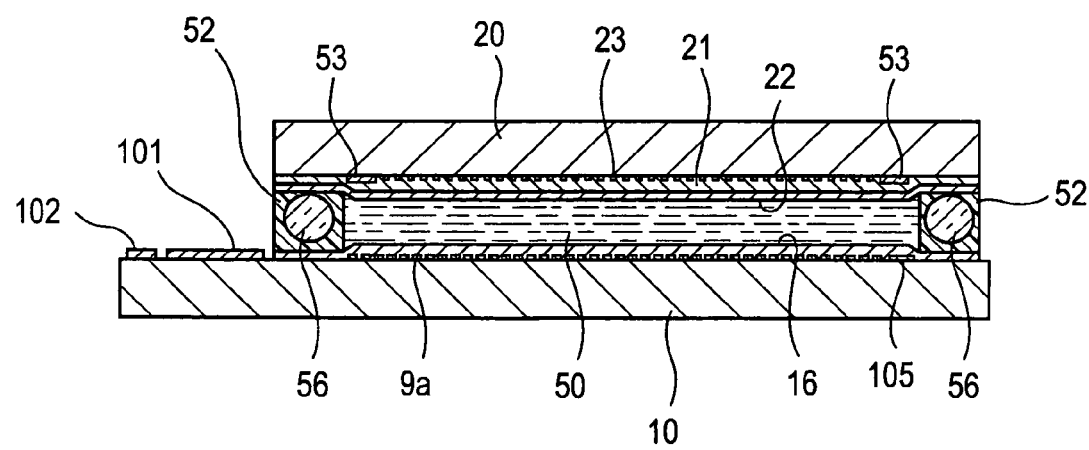
FIG. 3 is a sectional view taken along line III-III in FIG. 2.

In FIGS. 2 and 3, in the electro-optical device according to the embodiment, a TFT array substrate 10 and an opposing substrate 20 are disposed so as to oppose each other. A space between the TFT array substrate 10 and the opposing substrate 20 is filled with a liquid crystal layer 50, and the TFT array substrate 10 and the opposing substrate 20 are adhered to each other with a sealant 52 placed in a sealing area situated around an image display area 10a.

The sealant 52 is formed of, for example, ultraviolet curable resin or a thermosetting resin, or an ultraviolet curable/thermosetting resin for adhering both of the substrates to each other. The sealant 52 is hardened by ultraviolet light or heat after applying the sealant 52 to the TFT array substrate 10 in the manufacturing process. A gap material 56, such as glass fiber or glass beads, serving as a spacer for setting the gap between the TFT array substrate 10 and the opposing substrate 20 to a predetermined value is dispersed in the sealant 52. FIG. 3 shows a structure in which the substantially spherical glass beads (the gap material 56) is mixed in the sealant 52. More specifically, the electro-optical device according to the embodiment is as a light valve of the projector small and suitable for an enlarged display. In addition to or instead of mixing the gap material 56 in the sealant 52, the gap material 56 may be placed at the image display area 10a or at a peripheral area near the image display area 10a.

In FIG. 2, a frame-shaped light-shielding film 53 defining a frame-shaped area of the image display area 10a is provided on the opposing substrate 20 so as to be situated inwardly of the sealing area where the sealant 53 is applied. However, a portion of or the entire frame-shaped light-shielding film 52 may be provided as a built-in light-shielding film at the TFT array substrate 10.

A data line drive circuit 101 and an external circuit connection terminal 102 are provided in a portion of the peripheral area situated outwardly of the sealing area so as to extend along one side of the TFT array substrate 10. Scanning line drive circuits 104 extend along two sides adjacent to the aforementioned one side of the TFT array substrate 10 and is covered by the frame-shaped light-shielding film 53. In order to connect the two scanning line drive circuits 104 disposed at the respective sides of the image display area 10a, a plurality of wires 105 are disposed so as to extend along the remaining one side of the TFT array substrate 10 and to be covered by the frame-shaped light-shielding film 53.

Upper and lower conductive members 106 functioning as upper and lower conductive terminals between both of the substrates are disposed at the four corners of the opposing substrate 20. The upper and lower conductive terminals are disposed at the TFT array substrate 10 so as to oppose these corners. This makes it possible to achieve electrical conduction between the TFT array substrate 10 and the opposing substrate 20.

In FIG. 3, an alignment layer 16 is formed on pixel electrodes 9a on the TFT array substrate 10, with the pixel electrodes 9a being those after thin film transistors (TFTs) for pixel switching and wirings such as data lines and scanning lines have been formed. In addition to opposing electrodes 21, a lattice or stripe-like light-shielding film 23 is formed on the opposing substrate 20. An alignment layer 22 is formed on top of the light-shielding film 23, that is, on the topmost portion in relation to the opposing substrate 20. The liquid crystal layer 50 is formed of liquid crystals in which, for example, one type or a plurality of types of nematic liquid crystals are mixed, and is set in a predetermined orientation state between the pair of alignment layers.

In addition to the data line drive circuit 101, the scanning line drive circuit 104, etc., for example, a sampling circuit for sampling an image signal on an image signal line to supply it to a data line, a pre-charge circuit for supplying a pre-charge signal of a predetermined voltage level to a plurality of data lines prior to supplying the image signal, an inspection circuit for inspecting, for example, the quality of or any defects in the electro-optical device during manufacturing or shipment may be formed on the TFT array substrate 10 shown in FIGS. 2 and 3.

Next, the operation and structure of the circuits in the electro-optical device having the above-described structure will be described with reference to FIG. 4.

Figure 4:
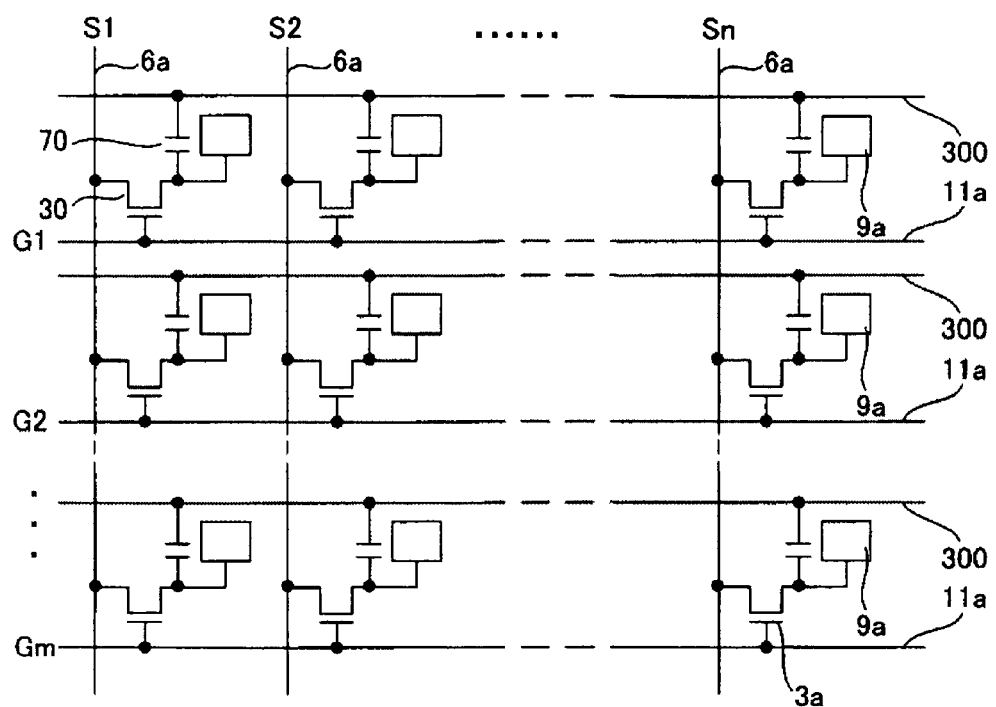
FIG. 4 shows an equivalent circuit of, for example, wirings and various devices in a plurality of pixels formed in a matrix and forming an image display area of the electro-optical device.

FIG. 4 shows an equivalent circuit of, for example, wirings and various devices in a plurality of pixels formed in a matrix and forming the image display area of the electro-optical device. In FIG. 4, in each of the pixels formed in a matrix and forming the image display area 10a of the electro-optical device according to the embodiment, a pixel electrode 9a and a TFT 30 for controlling the switching of the pixel electrode 9a are formed, with a data line 6a for supplying an image signal being electrically connected with a source of its associated TFT 30. Image signals S1, S2, ..., and Sn written to the data lines 6a may be supplied line sequentially in that order, or may be supplied to each group of adjacent data lines 6a.

Gate electrodes 3a are electrically connected with gates of the TFTs 30, and are formed so that scanning signals G1, G2, ..., and Gm are line sequentially applied in that order in pulses to the scanning lines 11a and the gate electrodes 3a at a predetermined timing. The pixel electrodes 9a are electrically connected with drains of the TFTs 30, and close the TFTs 30 serving as switching elements for only a certain period of time in order to write the image signals S1, S2, ..., and Sn supplied from the data lines 6a at a predetermined timing.

The image signals S1, S2, ..., and Sn of a predetermined level written to the liquid crystals (example of an electro-optical material) through the pixel electrodes 9a are held for a certain period of time between the opposing electrodes 21 formed on the opposing substrate 20. By changing the orientation and order of molecular aggregates in the liquid crystals by a voltage level that is applied, light is modulated to make grayshade possible. If a normally white mode is set, the transmittance ratio with respect to incident light is reduced in accordance with an applied voltage per pixel. In contrast, if a normally black mode is set, the transmittance ratio with respect to the incident light is increased in accordance with the applied voltage per pixel. Overall, light having contrast in accordance with the image signals exits from the electro-optical device.

In order to prevent leakage of the image signals held here, storage capacitors 70 are added in parallel with liquid crystal capacitances formed between the pixel electrodes 9a and the opposing electrodes 21. The storage capacitors 70 are disposed side by side with the scanning lines 11a, and include fixed potential capacitive electrodes and capacitive electrodes 300 having fixed constant potentials.

3. Embodiment of Mounting Structure

A mounting structure according to an embodiment of the invention will be described next with reference to FIGS. 5 to 7.

Figure 5:
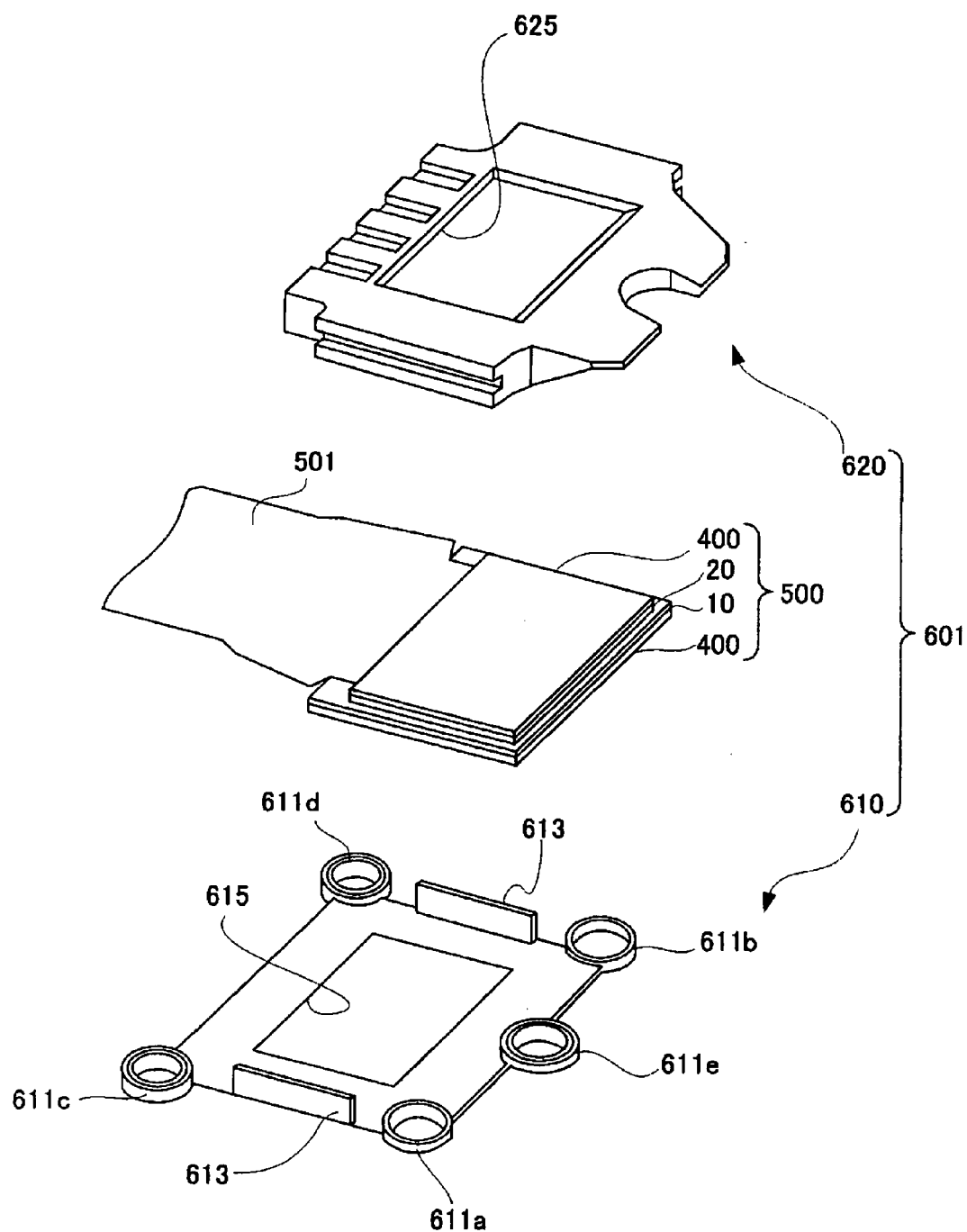
FIG. 5 is an exploded perspective view of a mounting structure according to an embodiment and the aforementioned electro-optical device.
Figure 6A:
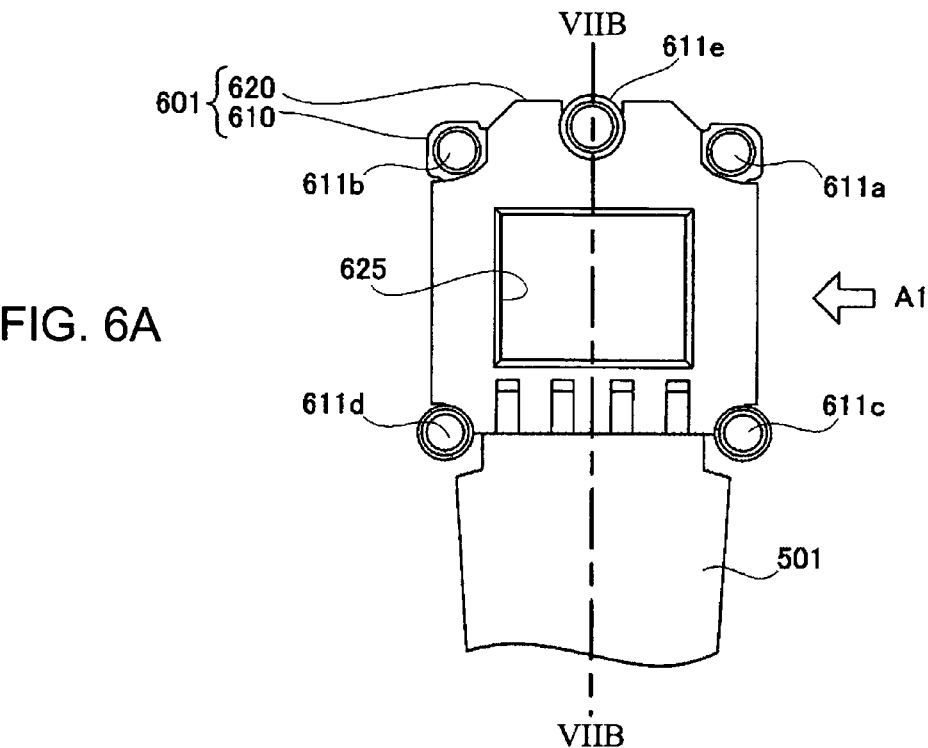
FIG. 6A is a plan view of the mounting structure as seen from an opposing substrate of the electro-optical device accommodated in the mounting structure, that is, as seen from the top.
Figure 6B:
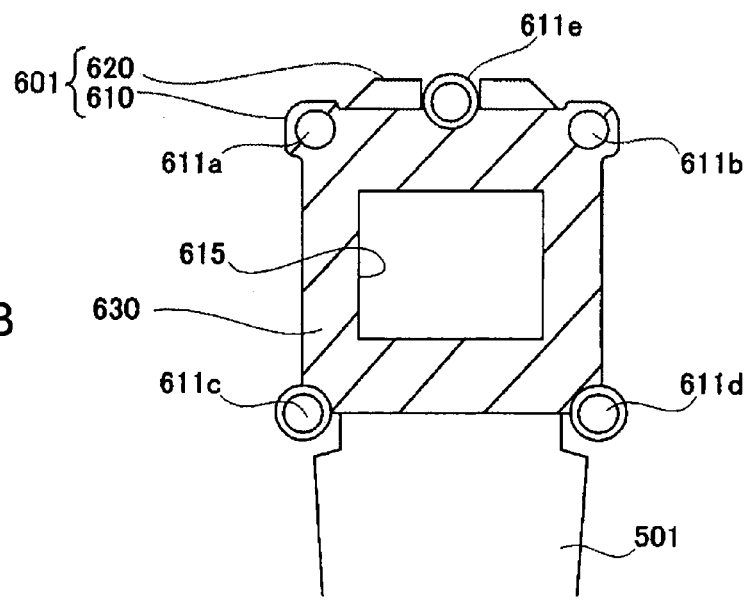
FIG. 6B is a bottom plan view of the mounting structure.
Figure 7A:
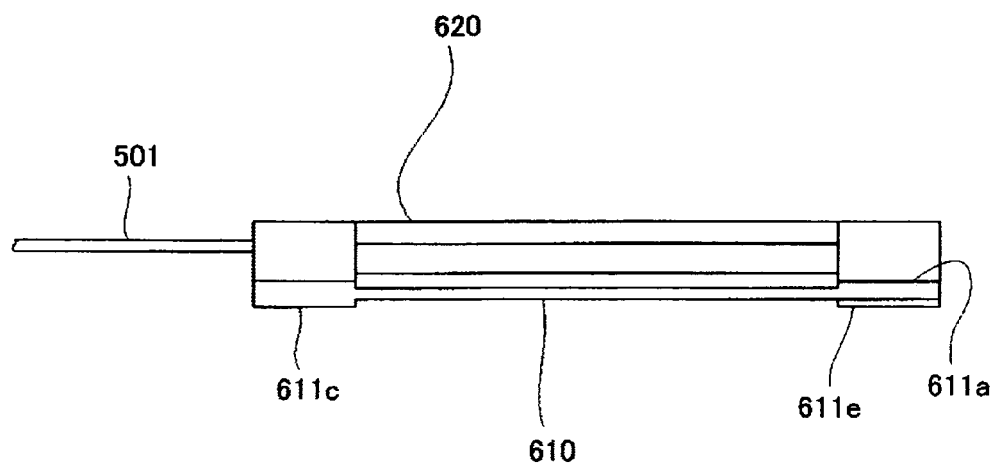
FIG. 7A shows the structure of a side surface as viewed in the direction of arrow A1 in FIG. 6A.
Figure 7B:
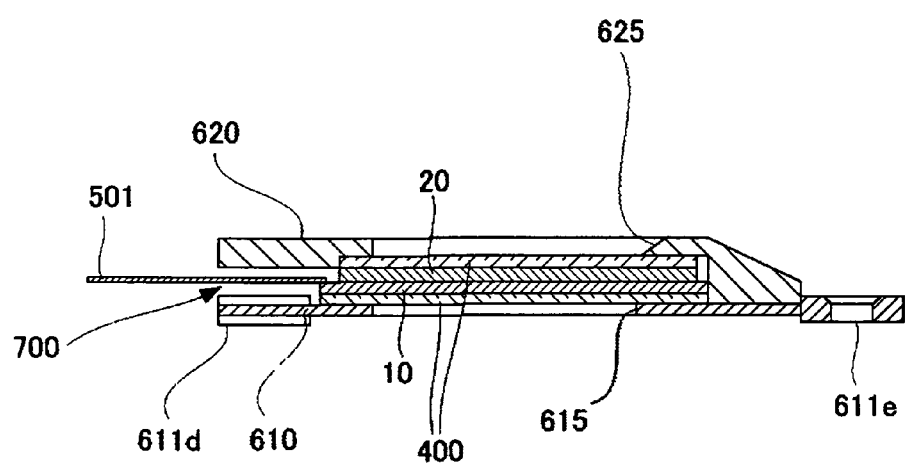
FIG. 7B is a sectional view taken along line VIIB-VIIB in FIG. 6A.

FIG. 5 is an exploded perspective view of, the mounting structure according to the embodiment and the aforementioned electro-optical device. FIG. 6A is a plan view of the mounting structure as seen from the opposing substrate of the electro-optical device accommodated in the mounting structure, that is, as seen from the top. FIG. 6B is a bottom plan view of the mounting structure. FIG. 7A shows the structure of a side surface as viewed in the direction of arrow A1 in FIG. 6A. FIG. 7B is a sectional view taken along line VIIB-VIIB in FIG. 6A.

As shown in FIGS. 5 to 7, the mounting structure has a mount case 601 (which is an example of a case in the embodiment of the invention) including a plate 610 and a cover 620. In addition to the various structural elements shown in FIGS. 2 and 3, an electro-optical device 500 accommodated in the mount case 601 include other optical elements, such as anti-reflection plates, that are superimposed upon a surface at a side of the TFT array substrate 10 or the opposing substrate 20 opposite to the side facing the liquid crystal layer 50. In addition, a flexible cable 501 is connected to the external circuit connection terminal 102. A polarizer and a retardation film may be provided in the optical system of the liquid crystal projector 1100, or may be superimposed upon a surface of the electro-optical device 500. In the embodiment, as mentioned later, the polarizer and the retardation film are provided at the dichroic prism 1112 of the liquid crystal projector 1100 with a jig for positioning and securing the mount case 601.

Here, as shown, in particular, in FIG. 5, a side of the TFT array substrate 10 not facing the liquid crystal layer 50 and a side of the opposing substrate 20 not facing the liquid crystal layer 50 are each provided with a dust-proof substrate 400, such as a transparent substrate formed of, for example, glass. By defocusing at the dust-proof substrates 400, when an image is displayed in the liquid crystal projector 1100, dust or dirt on the surfaces of the TFT array substrate 10 and opposing substrate 20 to which the respective dust-proof substrates 400 are adhered and dust or dirt adhered to the dust-proof substrates 400 are displayed in a blurred state on the display screen. Therefore, it is possible to prevent such dust and dirt from being distinctly seen on the display screen.

In order to supply various signals, such as a power supply signal, various control signals, a clock signal, and an image signal, generated on the basis of input image data input from an external device, to the data line drive circuit 101 or the scanning line drive circuit 104, a flexible substrate 501 is connected to a portion of or the entire external circuit connection terminal 102 through an anisotropic conductive film.

The electro-optical device 500 including the TFT array substrate 10, the opposing substrate 20, the dust-proof substrates 400, etc. is accommodated in the mount case 601 (including the plate 610 and the cover 620) by being adhered to the mount case 601 with, for example, an adhesive material that is not shown in FIGS. 5 to 7.

In the embodiment, it is assumed that light is incident from the cover 620, passes through the electro-optical device 500, and exits from the plate 610. In other words, with reference to FIG. 1, it is the plate 610 instead of the cover 620 that faces the dichroic prism 1112.

The structures of the cover 620 and plate 610 of the mount case 601 will hereunder be described in more detail.

First, the structure of the plate 610 will be described. As shown in FIG. 5 and FIG. 6B, the plate 610 includes a substantially quadrilateral member in plan view, and is disposed so as to face one surface of the electro-optical device 500. In the embodiment, the plate 610 and the electro-optical device 500 directly contact each other, and the latter is placed on the former.

More specifically, the plate 610 has a window 615, bent portions 613, and mount holes 611a to 611e.

As shown in FIG. 5, FIG. 6B, and FIG. 7B, the window 615 is an opening formed in a portion of the substantially quadrilateral member of the plate 610, and, for example, as shown in FIG. 7B allows light to pass downward. In the liquid crystal projector 1100, transmission light of the electro-optical device 500 exits as display light from the window 615. Accordingly, when the electro-optical device 500 is placed on the plate 610, a peripheral area near the image display area 10a of the electro-optical device 500 is provided as if it is in contact with the edges defining the window 615. The plate 610 holds the electro-optical device 500 in this way.

As shown in FIG. 5, FIG. 6A, and FIG. 7A, the bent portions 613 are formed by bending portions of two opposing sides of the substantially quadrilateral member of the plate 610 towards the inner sides of the substantially quadrilateral member. The outer sides of the bent portions 613 are formed so as to be in contact with the inner side surfaces of the cover 620 when the plate 610 is mounted to the cover 620.

As shown in FIG. 5 and FIG. 6B, the mount holes 611a to 611e are defined by walls of the plate 610. These walls are mount hole formation portions corresponding to "mounting units" in the embodiment of the invention. The mount holes 611a to 611e are used when, as described later, mounting the mounting structure to the dichroic prism 1112 in the liquid crystal projector 1100 shown in FIG. 1. In the embodiment, as shown in FIGS. 6A and 6B, these five mount holes 611a to 611e are formed in the peripheral portions of the mount case 601. More specifically, the mount holes 611a to 611d are formed in the four corners of the substantially quadrilateral member of the plate 610. The mount hole 611e is disposed so as to define a triangle with the two mount holes 611c and 611d among the five mount holes 611a to 611e. (In other words, the mount holes 611e, 611c, and 611d are formed so as to be situated at the vertices of the triangle.) According, in the embodiment, it is possible to secure the plate 610 at four points using the mount holes 611a to 611d at the four corners, and to secure the plate 610 at three points using the mount holes 611e, 611c, and 611d. Alternatively, at least some or all of the mount holes may be provided in the cover 620.

Here, as shown in FIG. 7B, it is desirable that the hole formation portions where the mount holes 611e and 611d and the mount hole 611c (not shown) are provided for securing the plate 610 at three points protrude from portions of the surface of the substantially quadrilateral member of the plate 610 not including these hole formation portions. According to such a structure, even if the member of the plate 610 manufactured by pressing is flexed, only the hole formation portions used for mounting and defining the securing points contact a surface for setting the mounting structure at the liquid crystal projector when securing the mounting structure to the dichroic prism 1112 in the liquid crystal projector 1100 with a screw. Therefore, stress that is generated in the mounting structure is reduced, so that it is possible to prevent damage to the electro-optical device resulting from transmission of the stress generated in the mounting structure to the electro-optical device.

In the embodiment, it is desirable that at least three protruding mount holes are provided so as to allow a securing operation at three points. Accordingly, as shown in FIG. 6B, a portion other than the portions where the three protruding mounting holes are formed is a flat portion 630.

In the embodiment, at least a portion of a surface at a side of the plate 610 opposite to a side facing the electro-optical device when the electro-optical device is placed on the plate 610 is formed of a magnetic material such as iron (Fe) or nickel (Ni). More specifically, the plate 610 itself may only be formed of the magnetic material, or a portion of the surface at the side of the plate 610 opposite to the side facing the electro-optical device may be formed of the magnetic material and the other portions may be formed a nonmagnetic material, such as a metallic material including aluminum (Al) or a stainless steel alloy or a resinous material.

Here, when the entire surface at the side of the plate 610 opposite to the side facing the electro-optical device is formed of the magnetic material, and as mentioned above, a minimum number of mount holes in the mounting structure required for securing the mounting structure, that is, three mount holes are used, it is possible to provide the flat portion 630 having a maximum size for allowing the plate 610 to be effectively magnetically chucked as mentioned below.

Next, the structure of the cover 620 will be described. As shown in FIGS. 5 to 7, the cover 620 includes a substantially rectangular parallelepiped member. When the electro-optical device 500 is accommodated in the mount case 601, the case 620 is disposed so as to face the surface at the side of the electro-optical device 500 opposite to the side facing the plate 610. When the electro-optical device 500 is accommodated in the mount case 601, the plate 610 on which the electro-optical device 500 is placed is mounted to the cover 620. In this state, the electro-optical device 500 is covered with the cover 620. The inner side surfaces of the cover 620 are in contact with the outer side surfaces of the electro-optical device 500 through an adhesive material (not shown) when the electro-optical device 500 is accommodated in the mount case 601.

Here, in order to prevent the escaping of light at the peripheral area of the electro-optical device 500 and to prevent the entrance of stray light into the image display area 10a from the peripheral area, it is desirable to form the cover 620 or the cover 620 and the plate 610 using, for example, light-shielding resinous material or metallic material. In order for the cover 620 or the plate 610 to function as a heat sink with respect to the electro-optical device 500, the cover 620 or the plate 610 is formed of a material having a relatively high thermal conductivity, that is, a material that conducts heat very well, such as aluminum (Al), magnesium, or copper, or an alloy thereof.

If the cover 620 or the plate 610 is formed of a material that conducts heat very well, since the cover 620 contacts the electro-optical device 500 through, for example, an adhesive material, it is possible to absorb the heat being transmitted to the cover 620 from the electro-optical device 500 by such a contact portion. Therefore, it is possible to effectively prevent the accumulation of heat at the electro-optical device 500 resulting from the electro-optical device 500 being irradiated with intense light by the lamp unit 1102.

Since the outer side surfaces of the bent portions 613 are in contact with the inner side surfaces of the cover 620 as mentioned above, heat is also transmitted from the latter to the former. Accordingly, since, in principle, the heat from the electro-optical device 500 is obtained in correspondence with the ideal heat capacity of both the plate 610 and the cover 620, the electro-optical device 500 is considerably effectively cooled.

As shown in FIG. 7B, since the inner portion of the substantially parallelepiped member of the cover 620 accommodates the electro-optical device 500, the inner portion appears as if it has been gouged out. More precisely, the cover 620 is a box-shaped member having no covering portion. (Here, "covering portion" refers to the plate 610.)

As shown in FIG. 5, FIG. 6A, and FIG. 7B, a window 625 is formed in the cover 620. The window 625 is an opening formed in the bottom surface (top surface in FIGS. 5 and 7) of the box-shaped member. The window 625 allows light to pass downward in FIG. 7B. Light emitted from the lamp unit 1102 in the liquid crystal projector 1100 shown in FIG. 1 can pass through the window 625 and impinge upon the electro-optical device 500. As in the case of the window 615 in the plate 610, the cover 620 having the window 625 may be formed so that the peripheral area situated near the image display area 10a of the electro-optical device 500 is in contact with the side edges defining the window 625. According to this structure, the electro-optical device 500 can also be held by the cover 620, in particular, by the side edges defining the window 625.

As shown in FIG. 7B, a space 700 for fitting the flexible substrate 501, connected to the electro-optical device 500, in a direction of extension of the flexible substrate 501 is defined by a side wall of the substantially rectangular parallelepiped member of the cover 620. The space 700 is formed by cutting a portion of the side wall of the substantially rectangular parallelepiped member of the cover 620 facing the flexible substrate 501. Accordingly, the space 700 corresponds to the cut portion of the side wall of the substantially rectangular parallelepiped member of the cover 620. Therefore, the electro-optical device 500 can be accommodated in the cover 620 without bending the flexible substrate 501.

Accordingly, according to the mounting structure described above, it is possible to hold the mounting structure by securing the surface of the plate 610 formed of a magnetic material by magnetic force, that is, by magnetically chucking the surface while the electro-optical device 500 is accommodated in the mount case 601. Therefore, compared to the case in which the mounting structure is held with a mechanical chuck or a vacuum chuck, the mounting structure can be held with a simple mechanism. When a magnet chuck is used, the surface formed of a magnetic material of the plate 610 of the mount case 601 is secured, so that, compared to the case in which a mechanical chuck or a vacuum chuck is used, stress generated in the mounting structure can be reduced. Therefore, it is possible to prevent damage to the electro-optical device 500 resulting from transmission of stress generated in the mounting structure to the electro-optical device 500 accommodated in the mounting structure when the mounting structure is held.

4. Embodiment of Magnetic Chucking Device

Next, referring to FIG. 8 to FIG. 11, magnetic chucking devices according to an embodiment of the invention will be described.

Figure 8:
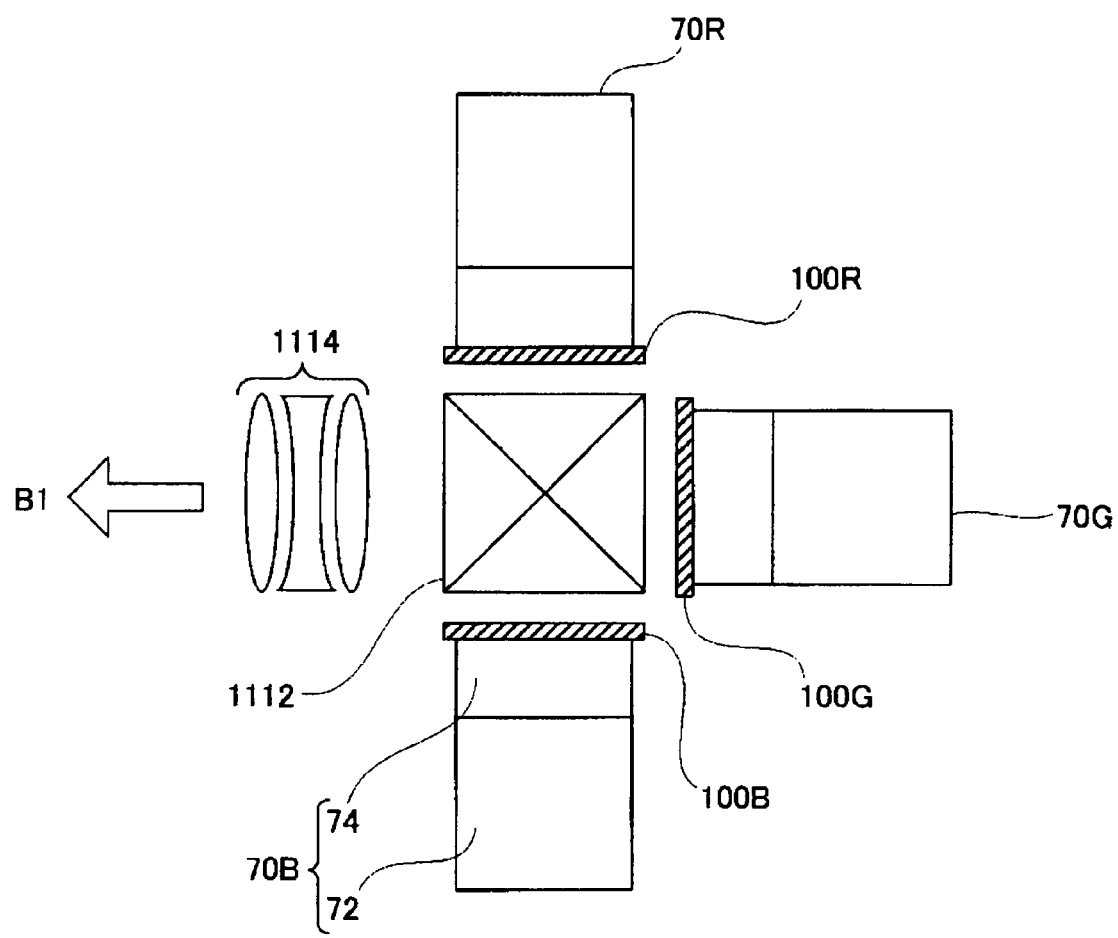
FIG. 8 is a schematic view showing the disposition of magnetic chucking devices with respect to light valves in a liquid crystal projector.
Figure 9:
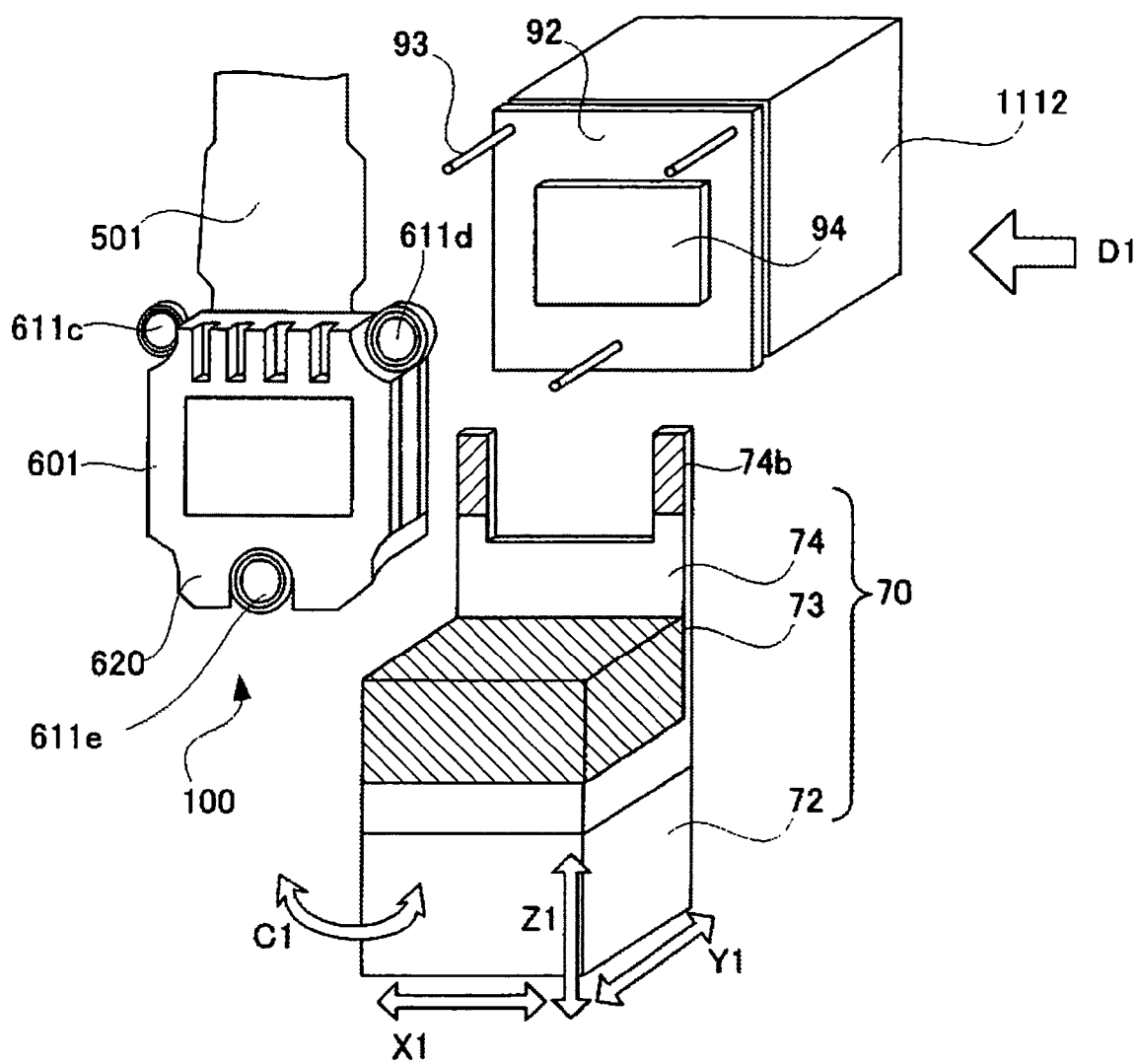
FIG. 9 shows a structure regarding the positioning of a light valve with respect to a dichroic prism.
Figure 10:
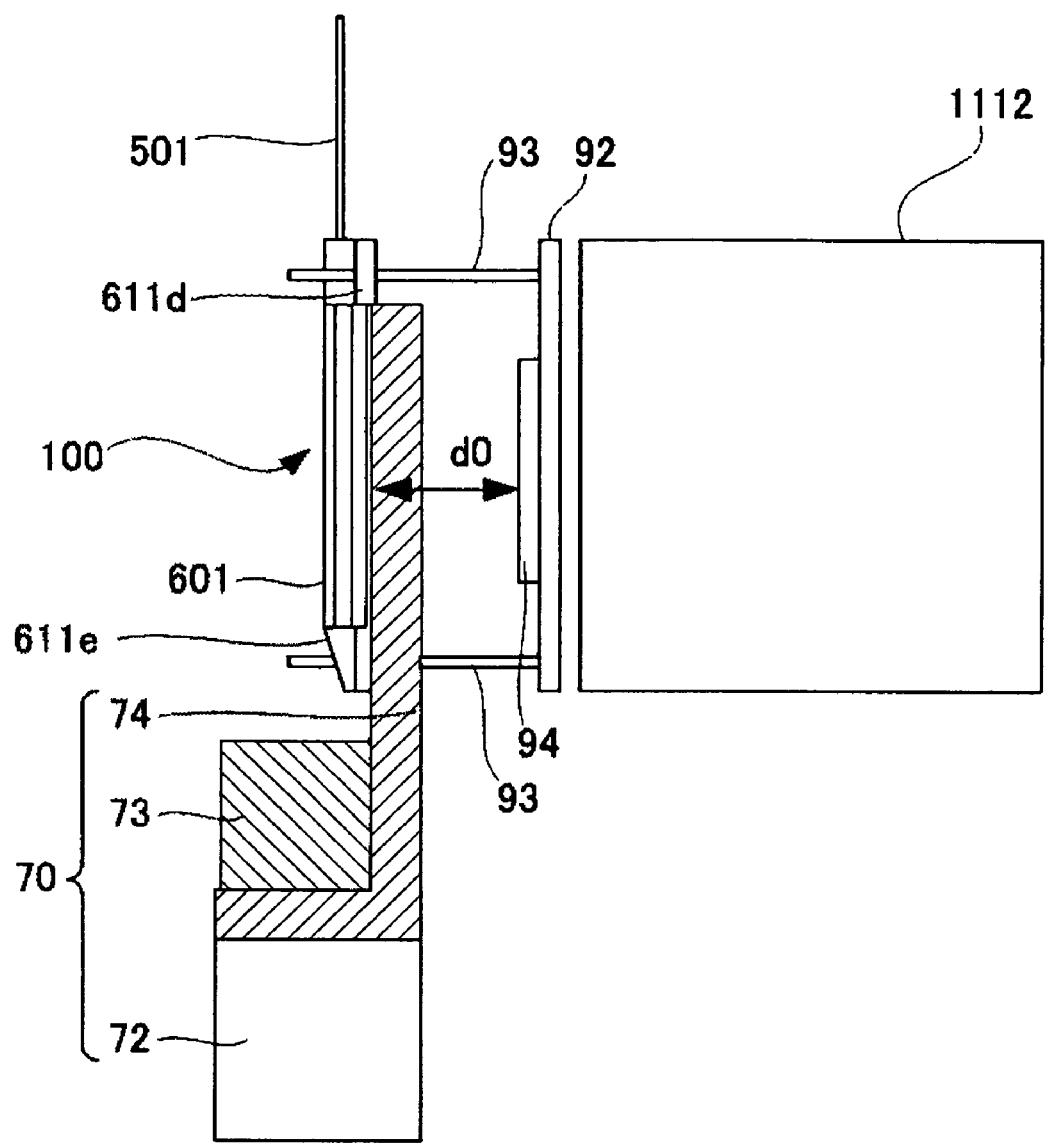
FIG. 10 shows the arrangement of the magnetic chucking device and the light valve with respect to the dichroic prism as viewed in the direction of arrow D1 in FIG. 9.
Figure 11:
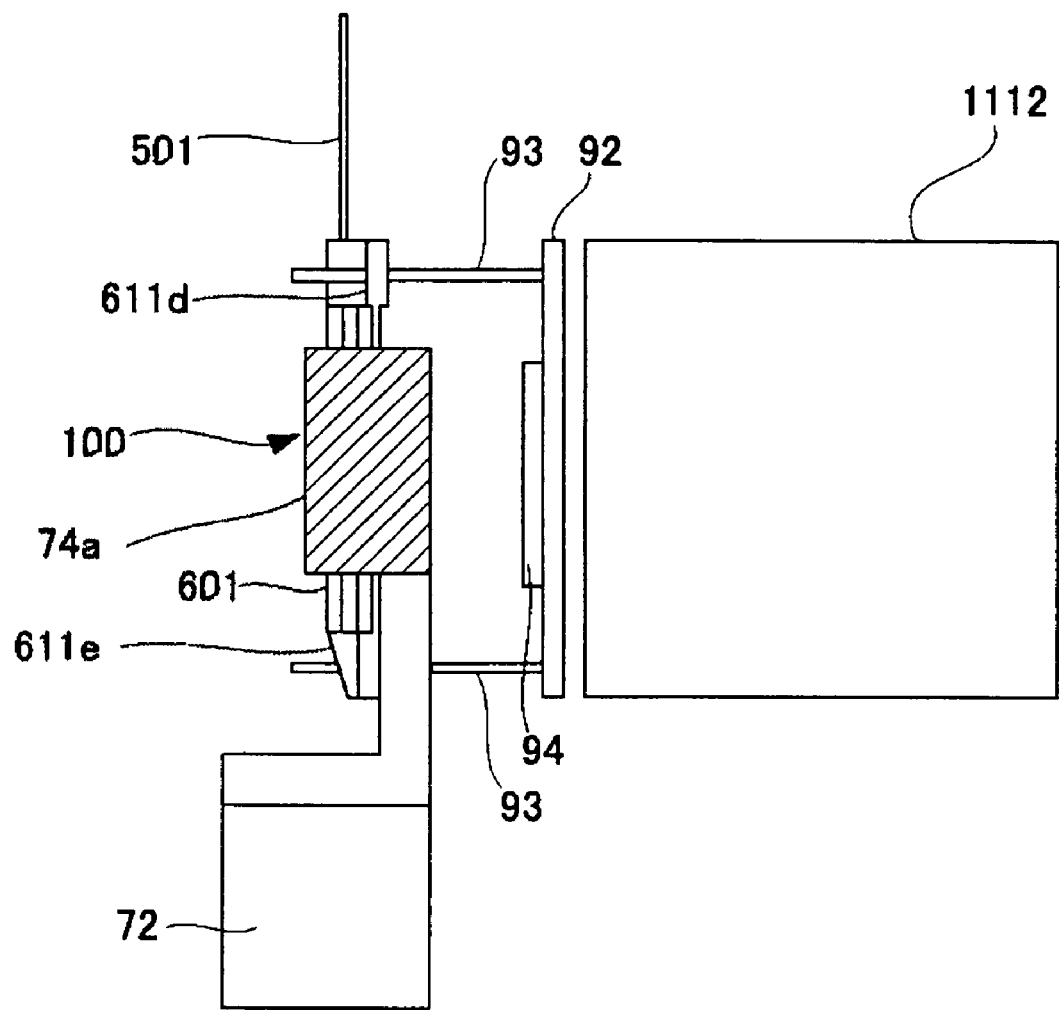
FIG. 11 shows a structure similar to that shown in FIG. 10, in a comparative example of the embodiment.

FIG. 8 is a schematic view showing the arrangement of the magnetic chucking devices with respect to the light valves in the liquid crystal projector. FIG. 9 shows a structure regarding the positioning of a light valve with respect to the dichroic prism. FIG. 10 shows the arrangement of the magnetic chucking device and the light valves with respect to the dichroic prism as viewed in the direction of arrow D1 in FIG. 9. FIG. 11 shows a structure similar to that shown in FIG. 10, in a comparative example of the embodiment.

When the liquid crystal projector 1100 shown in FIG. 1 is assembled, the light valves 100R, 100G, and 100B are positioned with respect to the dichroic prism 1112 or with respect to each other. Here, as shown in FIG. 8, the light valves 100R, 100G, and 100B are secured to and held by magnetic chucking devices 70R, 70G, and 70B, respectively. The magnetic chucking devices 70R, 70G, and 70B each have an adjusting unit 72 (which is an example of a moving unit in the embodiment of the invention) and an arm 74 (which is an example of a securing unit in the embodiment of the invention). In FIG. 8, the projection lens 1114 projects light towards, for example, the screen in the direction of arrow B1. In positioning the light valves 100R, 100G, and 100B in the liquid crystal projector 1100, only the electro-optical device or devices that are accommodated in the mounting structures among the light valves 100R, 100G, and 100B may be held by the respective magnetic chucking devices, or at least one of the electro-optical devices accommodated in the mounting structures may be held by the magnetic chucking device.

Here, FIG. 9 will focus on one of the light valves 100R, 100G, and 100B, and this light valve will be called a light valve 100. In FIG. 9, the other two light valves among the light valves 100R, 100G, and 100B, the magnet chucking devices for these two light valves, and other structure features will not be shown.

As shown in FIG. 9, in the embodiment, a jig 92 for position and securing the light valve 100 with respect to the dichroic prism 1112 is provided at the dichroic prism 1112.

With the light valve 100 being mount to the jig 92, a polarizer 94 is mounted to a surface of the jig 92 at a side opposite to the side facing the dichroic prism 1112 so as to be situated in correspondence with the positions of the window 615 and the window 625 of the mount case 601 at the light valve 100. In addition, with the light valve 100 being mounted to the jig 92, pins 93 are provided at the side of the jig 92 that is opposite to the side facing the dichroic prism 1112 so as to be situated where the mount holes 611a to 611d are formed at the four corners of the plate 610 of the mount case 601.

By positioning the three pins 93 of the jig 92 and the three mount holes 611c, 611d, and 611e in the mount case 601, or by positioning the windows 615 and 625 of the mount case 601 with respect to the polarizer 94, the light valve 100 and the dichroic prism 1112 can be positioned with respect to each other. It is desirable that the pins 93 and the polarizer 94 be previously provided on the jig 92 so that the positions of the light valves 100R, 100G, and 100B are in correspondence with each other with the light valve 100 being mounted to the jig 92. The state in which the position of the light valve 100 and the position of the dichroic prism 1112 are in correspondence with each other is equivalent to a state in which the position of the electro-optical device accommodated in the mount case 601 is in correspondence with the position of the dichroic prism 1112. In addition, in this state, the electro-optical devices or the light valves 100R, 100G, and 100B are in correspondence with each other.

The magnetic chucking device 70 is used to secure the light valve 100 to its arm 74, and to move the arm 74 to which the light valve 100 is secured with the adjusting unit 72. This makes it possible to move and position the light valve 100 secured to the arm 74 with respect to the dichroic prism 1112. Focusing on the essential function of such a magnetic chucking device, it is possible to use the magnetic chucking device to simply hold the dichroic prism 1112 and transport the held dichroic prism 1112 into or out of the liquid crystal projector 1100. More specifically, for example, in FIG. 9, the adjusting unit 72 extends parallel with the side surfaces of the dichroic prism 1112, can move in the dimensions of arrows X1 and Z1 that are perpendicular to each other and in the dimension of arrow Y1 (depth dimension with respect to the side surfaces of the dichroic prism 1112 extending parallel to these two dimensions), and can rotate in the dimension of arrow C1 parallel to the dimensions of arrows X1 and Y1. The dimensions of movement of the adjusting unit 72 are not limited to the four dimensions of the arrows X1, Y1, Z1, and C1. For example, the adjusting unit 72 may only move in one of the four dimensions of the arrows X1, Y1, Z1 and C1.

In the embodiment, in the mount case 601, at least a portion of the surface at the side of the plate 610 opposite to the side facing the electro-optical device is formed of a magnetic material. The arm 74 secures and holds the plate 610 of the mount case 601 at the light valve 100 by magnetically chucking the surface of the plate 610 formed of the magnetic material.

In order to make it possible to hold the plate 610 in this way, at least a portion of each portion 74b of the arm 74 that contacts the plate 610 is formed of a magnetic material, and the magnetic chucking device 70 includes a magnetic force generator 73 for intermittently generating magnetic force at each portion 74b. With magnetic force being generated at each contact portion 74b of the arm 74 that contacts the plate 610, the surface of the plate 610 formed of the magnetic material can be secured to the contact portions 74b with magnetic force. Here, as mentioned above, by using a minimum number of mount holes in the mount case 601 that allows the mount case 601 to be secured, that is, by using three mount holes, it is possible to more reliably hold the plate 610 with the magnet chuck, so that the light valve 100 can be more precisely positioned with respect to the dichroic prism 1112. The magnetic force generator 73 may be one which generates magnetic force by a permanent magnet or one which generates magnetic force by an electromagnet. For example, the magnetic force may be generated or the generation of the magnetic force may be stopped by intermittently supplying electrical current to the magnetic force generator 73 including, for example, an electromagnet.

An opening corresponding to at least a portion of the external shape of the window 615 of the plate 610 is formed between the portions 74b of the arm 74 that contact the plate 610. By positioning the portion where the opening is formed and the window 615 of the plate 610 with respect to each other, the light valve 100 can be positioned with respect to the arm 74.

FIG. 10 shows the arrangement of the magnetic chucking device 70 and the light valve 100 with respect to the dichroic prism 1112 in a state in which the light valve 100 is moved and positioned with respect to the dichroic prism 1112 with the magnetic chucking device 70.

It is desirable that the light valve 100 positioned in this way be disposed so as to be separated from the polarizer 94 mounted to the jig 92 by an interval d0, for example, on the order of 2 mm. This makes it possible to circulate cooling air, which is supplied by the cooler in the liquid crystal projector 1100, between the light valve 100 and the dichroic prism 1112, and to contact the light valve 100 and the dichroic prism 1112 with the cooling air. Therefore, even if the temperature of either of the light valve 100 or the dichroic prism 1112 is increased, it is possible to effectively cool the light valve 100 or the dichroic prism 1112.

By mounting the light valve 100 to the jig 92 so that they are separated by the predetermined interval d0, disposing the arm 74 in this interval, and moving the light valve 100 secured to the arm 74 with respect to the dichroic prism 1112, the positioning can be easily carried out. By disposing the arm 74 in this way, it is possible to effectively magnetically chuck a larger portion of the surface of the plate 610 of the mount case 601 at the light valve 100. As a result, since the plate 610 can be more reliably held at the arm 74 with the magnetic chuck, the light valve 100 can be more precisely positioned with respect to the dichroic prism 1112.

After positioning the light valve 100 with respect to the dichroic prism 1112 in this way, the light valve 100 is secured and mounted to the jig 92. For example, with the three mount holes 611c, 611d, and 611e and the three pins 93 being aligned, these are secured with an adhesive, so that the light valve 100 is mounted to the jig 92. Here, FIG. 10 does not show a detailed structure regarding the securing of the light valve 100 to the jig 92.

By stopping the generation of the magnetic force at the arm 74 by the magnetic force generator 73, the holding of the light valve 100 that has been positioned and mounted to the jig 92 is completed. Therefore, the arm 74 can easily hold the light valve 100.

Here, as shown in FIG. 11, when the light valve 100 is secured to an arm 74a with a mechanical chuck, the mount case 601 at the light valve 100 is grasped from the left and right by the arm 74a. Therefore, when the light valve 100 is positioned with respect to the liquid crystal projector 1100, a large stress is produced in the mount case 601 compared to that produced when the magnetic chuck is used, and the stress produced in the mount case 601 is transmitted to the electro-optical device accommodated in the mount case 601, as a result of which the electro-optical device may be damaged. In addition, in order to perform such mechanical chucking, a complicated mechanism of the arm 74a is required compared to that used when performing magnetic chucking.

In contrast, in the embodiment, the mechanism for holding the light valve 100 in the arm 74 is simple, and stress that is produced in the mount case 601 at the light valve 100 when positioning the light valve 100 in the liquid crystal projector 1100 can be reduced. Therefore, the structure of the magnetic chucking device 70 can be simplified, and it is possible to prevent the problem of the electro-optical device becoming damaged due to the transmission of stress produced in the mount case 601 at the light valve 100 when positioning the light valve 100 in the liquid crystal projector 1100.

In the embodiment described above, in the liquid crystal projector 1100, the light valve 100 may be disposed so that the cover 620 of the mount case 601 for the light valve 100 faces the dichroic prism 1112. In this case, by magnetically chucking the surface of the mount case 601 (for the light valve 100) at the side that is opposite to the side facing the dichroic prism 1112 when the light valve 100 is positioned in the liquid crystal projector 1100, the mount case 601 may be secured to the arm 74 of the magnetic chucking device 70. Therefore, as mentioned above, compared to the case in which the surface of the mount case 601 at the side facing the electro-optical device is held by the arm 74, the arm 74 can be disposed in a larger space. Consequently, the surface of the mount case 601 at the side opposite to the side facing the electro-optical device may be effectively magnetically chucked at various locations or a larger portion of the surface may be effectively magnetically chucked. In addition, it is possible to move the arm 74 in a wide space by the adjusting unit 72. Therefore, the light valve 100 can be more easily and reliably held by the arm 74. As a result, the mechanism for holding the light valve in the arm 74 becomes simpler, and the light valve 100 can be more precisely positioned in the liquid crystal projector 1100.

MODIFICATIONS

Next, modifications of the embodiments will hereunder be described.

In addition to the plate 610 or instead of the plate 610, in the mount case 601 for the light valve 100, at least a portion of the surface of the cover 620 at the side opposite to the side facing the electro-optical device may be formed of a magnetic material.

Examples of a method for forming the cover include a method of insert or outsert molding the magnetic material with respect to non-magnetic material such as resin, or a method of adhering the magnetic material.

As in the case where the plate 610 is held, the light valve 100 can be held by the magnetic chucking device 70 by securing the surface formed of a magnetic material of the cover 620 with a magnetic chuck. In the liquid crystal projector 1100, when the plate 610 of the mount case 601 for the light valve 100 is disposed so as to face the dichroic prism 1112, it is possible to hold the light valve 100 with a simpler mechanism at the arm 74 of the magnetic chucking device 70 and to more precisely position the light valve 100 in the liquid crystal projector 1100.

In addition, when the plate 610 and the cover 620 are each formed of a magnetic material, it is possible to secure the surface formed of the magnetic material of the plate 610 or the cover 620 with the magnetic chuck and hold it with the magnetic chucking device 70. Therefore, even if either one of the plate 610 and the cover 620 is disposed facing the dichroic prism 1112, it is possible to secure the mount case 601 to the arm 74 by magnetically chucking the surface at the side of the mount case 601 opposite to the side facing the dichroic prism 1112.

The invention is not limited to the above-described embodiments. Various modifications may be made within a scope not departing from the gist or principles of the entire specification and the claims. A mounting structure of such a modification, an electro-optical device mounted to or accommodated in such a modified mounting structure, an electronic apparatus including such an electro-optical device, and a magnetic chucking device for transporting such a modified mounting structure are included within the technical scope of the invention.

What is claimed is:

1. A chucking device for holding an electro-optical device including a case and an electro-optical panel, the case being formed from a magnetic material and having a frame shape with a window, electro-optical panel being mounted in the case and exposed through the window in the case, the chucking device comprising:

an arm having two forked portions separated by an opening that corresponds to at least a portion of the external shape of the window of the case;

a magnetic force generator that generates magnetic force at the forked portions of the arm; and an adjusting unit that selectively moves the arm in three directions that are substantially perpendicular to each other.

2. A chucking device according to claim 1, the arm extending vertically from the magnetic force generator.

* * * * *